United States Patent [19]

Keene et al.

[11] Patent Number: 4,573,829

[45] Date of Patent: Mar. 4, 1986

[54] PLASTIC-PIPE LOCATOR TOOL

[76] Inventors: Terrell M. Keene, 800 S. Bradfield Ave., Compton, Calif. 90221; Wiley C. Calhoun, 13739 McNab St., Bellflower, Calif. 90706; Edgar J. Flemming, 5742 S. Van Ness St., Los Angeles, Calif. 90062; Eugene E. Haggard, 4259 N. Jerry Ave., Baldwin Park, Calif. 91706; David L. Taylor, 11249 Hulme Ave., Lynwood, Calif. 90262; Richard N. Hartley, 11600 Hollyview Dr., La Mirada, Calif. 90638; Francisco J. Martinez, 8348 Terradell St., Pico Rivera, Calif. 90660; Harry E. Sullivan, 1559 Albright St., Upland, Calif. 91786; Arvil B. Mason, 13627 Ocana Ave., Bellflower, Calif. 90706; Wayne M. Lucas, 411 N. Willow Ave., Long Beach, Calif. 90806

[21] Appl. No.: 626,191

[22] Filed: Jun. 29, 1984

[51] Int. Cl.4 .............................................. E03B 7/09
[52] U.S. Cl. ..................... 405/157; 242/96; 254/134.3 R; 254/134.3 FT; 324/220; 324/67; 405/154; 166/255
[58] Field of Search ............... 405/157, 154; 166/255, 166/254, 253, 250; 15/104.3 SN; 33/138; 242/96; 254/134.3 FT, 134.3 R; 324/559

[56] References Cited

U.S. PATENT DOCUMENTS

| | | | |
|---|---|---|---|
| 2,838,280 | 6/1958 | Eyles | 254/134.3 FT |
| 2,928,656 | 3/1960 | Lindsey | 254/134.3 FT |
| 2,978,637 | 4/1961 | Price et al. | 324/559 |
| 3,078,073 | 2/1963 | Zizzo | 254/134.3 R |
| 3,288,210 | 11/1966 | Bryart | 166/254 |
| 3,412,815 | 11/1968 | Holser et al. | 166/254 X |
| 3,504,503 | 4/1970 | Allen | 405/157 |
| 3,753,091 | 8/1973 | Daspit | 405/157 X |
| 3,971,543 | 7/1976 | Shanahan | 254/134.3 R |
| 4,039,142 | 8/1977 | Smith | 254/134.3 FT |
| 4,449,098 | 5/1984 | Nakamura | 405/157 |

Primary Examiner—Dennis L. Taylor
Attorney, Agent, or Firm—Bruce L. Birchard

[57] ABSTRACT

To assist in locating an underground or otherwise hidden non-electrically-conducting plastic pipe carrying a fluid such as heating gas a tool is provided which comprises a reel of relatively stiff but flexible locator wire, a hermetically-sealing first bushing through which the locator wire passes and a coupler for engaging a pipe exposed to view but coupled to and communicating for fluid flow with the pipe to be located, such coupler being adapted to receive, in snug fashion, said first bushing and including a packing membrane through which said locator wire passes to further assure no loss of fluid from the pipe being located, said locator terminating at its extremity remote from the reel in a guide member having a shape which may be described as suggestive of an oblate spheroid; i.e., it is symmetrical about an axis aligned with the axis of the locator wire and has an equator from which it tapers downwardly in diameter towards two aligned ends; such guide member being inserted through the exposed pipe and into the pipe to be located, wherein it is pushed by means of the stiff locator wire until the terminus of pipe to be located is reached, whereupon appropriate signals are applied to such wire to permit the detection of the location of such wire and the plastic pipe, by appropriate signal sensing equipment. Alternatively, magnetometer detection equipment may be utilized to locate the locator wire.

5 Claims, 2 Drawing Figures

PLASTIC-PIPE LOCATOR TOOL

BACKGROUND OF THE INVENTION

1. Field of the Invention

This invention relates to pipe locating equipment and, more particularly, to plastic-pipe locating equipment.

2. Prior Art

In the 1950's many utilities, such as those providing gas for heating purposes, installed plastic pipes between the mains and the houses or buildings being serviced. In some cases, locating wires were provided along with the plastic pipes, but in many cases locating wires were not provided. With time, the plastic pipes became brittle and required, and still require, replacement. Such pipes are, of course, buried and connect with the mains well below the surface of the earth. With metal pipes, it is quite simple to trace the location of the pipe by means of magnetometer devices or by applying R.F. signals to the pipe and picking up the radiation from the pipe with a sensing device. With plastic pipes having no locator wires, conventional techniques are not applicable. It has been the practice, up to the time of this invention, to look for characteristic markings on the curbings, such markings having been applied by the individuals who installed the plastic pipes. Conventionally a "G" was marked on the curbing where the pipe, in this case a gas pipe, passed into the street headed toward the main gas pipe. Experience showed that the markings were not accurate and the workers were forced to dig numerous holes in an attempt to find the connection between the plastic pipe and the main pipe. The number of the installations of plastic pipes, particularly in the gas industry, was very large and the randomness of the "dig-and-hope" method originally applied, cost the gas companies large sums of money. It was found that, on the average, seventy minutes of time was wasted in trying to find the connection between the plastic pipe and the main pipe.

Therefore it is an object of this invention to overcome the disadvantages and problems of prior art methods for finding plastic pipes which are being used to carry fluids.

It is a further object of this invention to provide a tool which will assist in the finding, with the minimun expenditure of time and money, the location of plastic pipes being utilized to carry fluids such as heating gas.

SUMMARY OF THE INVENTION

By carrying extendably on a rotatable reel, a stiff but flexible wire (such as piano wire) and passing such wire through a first hermetically sealing bushing and through a coupler which may be connected into a riser pipe which is coupled to the plastic pipe to be located (and communicates, for fluid flow, with such plastic pipe) such coupler being adapted to receive the first bushing and including a second hermetically sealing member or packing through which such stiff but flexible locator wire passes, and terminating such locator wire in a guide member which may be an oblate spheriod in shape, but in any case is tapered in diameter from an equator in a direction towards and away from the locator wire and carried co-axially on the end of the locator wire, the locator wire may be pushed through the plastic pipe until the guide member strikes the main pipe. At that time a locating signal may be applied to the locator wire outside the first bushing and, if it is an R.F. signal that is applied, an R.F. sensing device may be passed over the surface below which the plastic pipe is passing so that the path of the plastic pipe may be traced for each excavation of the plastic pipe. Since it is comtemplated that the locator wire will be of a material which may be magnetic, magnetometer techniques may be utilized for finding the location of the wire, and hence of the plastic pipe. The reel may be provided with means for locking the wire in position once it has been extended. The reel may be supported rotatably from a grip-like member through which the locator wire passes before entering the first bushing. The grip member may be held with one hand and the wire pushed with the other, such pushing action resulting in rotation of the reel member and passage of the locator wire to the extremity of the plastic pipe being located.

BRIEF DESCRIPTION OF THE DRAWINGS

The present invention can best be understood by referring to the description which follows and taking it in conjunction with the accompanying drawings, in which.

DETAILED DESCRIPTION OF THE PREFERRED EMBODIMENT

Figure 1:
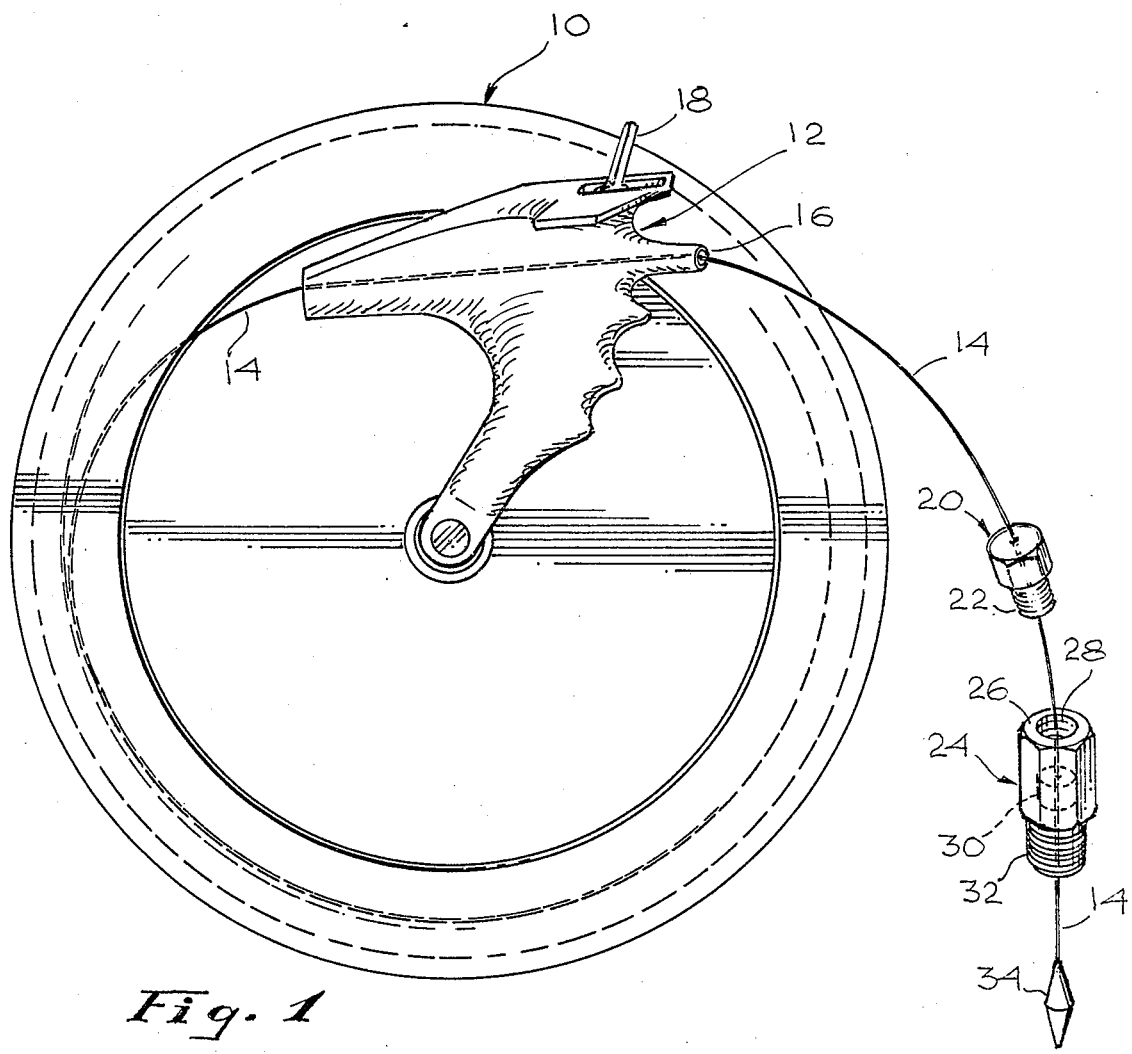
FIG. 1 is an orthogonal plan view of a plastic pipe locator tool according to the present invention; and, FIG. 2 is an elevational view of the plastic pipe locator tool of FIG. 1

In FIG. 1, reel 10 is rotatably supported from grip 12. Reel 10 carries a stiff but flexible wire 14 thereon. Such wire may be piano wire having a diameter of 0.061 inches, for example. Wire 14 passes through grip 12, emerging at outlet opening 16. Grip 12 includes a brake 18 which frictionally engages wire 14 within grip 12 so as to, when desired, stop the paying out of wire from reel 10 through outlet opening 16 in grip 12. Brake 18 is spring biased into frictional engagement with wire 14 so that, normally, wire 14 is prevented from emerging from grip 12 until brake 18 is released through the application of finger pressure to brake 18.

Wire 14 passes through first bushing 20 which engages wire 14 snugly so as to form a sliding hermetic seal between bushing 20 and wire 14. First bushing 20 may be of plastic material and it carries at one end thereof a threaded portion 22.

Wire 14 further continues through coupling 24 which has, at one end 26, thereof, a threaded receptacle region 28 for receiving portion 22 of first bushing 20. Coupler 24 may have, internally thereto, a second hermetically sealing member 30 which is snugly contained within coupler 24 and which snugly engages wire 14 as it passes through coupler 24. The remote end 32 of coupler 24 is threaded for engagement with the riser pipe in the system which feeds the fluid from the main pipe to the house or other building where the fluid is to be utilized. The consideration here was for the use of this equipment in connection with heating gas and, therefore, the importance of a snug fit of the bushing around the wire is apparent.

Wire 14 terminates in a guide member 34 which is metallic in nature and which may have a shape quite like that of an oblate spheroid. The shape of the member may vary somewhat but primarily it comprises an equatorial region of maximum diameter. The member then tapers in both directions towards and away from the end of wire 14 so as to make the introduction of wire 14 and its removal from the pipes in the system being repaired, easy and free of such problems as the wire's becoming snagged in unions or other joints in the pipes.

Figure 2:
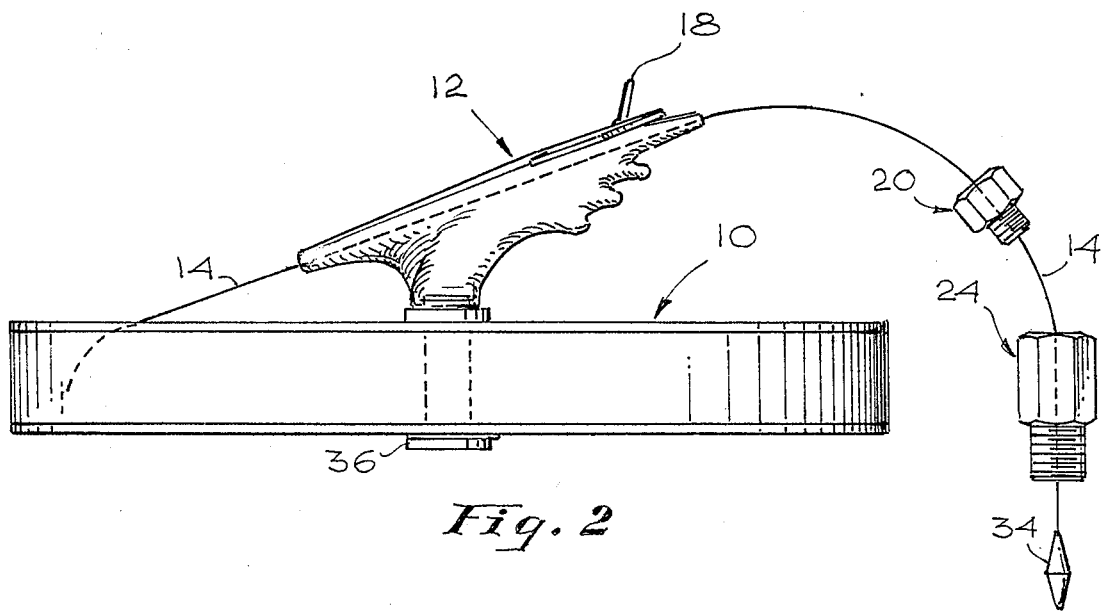

Similar elements of the invention in FIG. 2 are given the same numbers as those applied in FIG. 1. As can be seen in FIG. 2 reel 10 is carried (by reason of bolt 36) rotatably from grip 12.

The tool of FIGS. 1 and 2 is used as follows, in a heating-gas distribution system, for example. The gas meter is shut down or by-passed. The meter set assembly to the service valve is disconnected and coupling 24 is screwed into the service stopcock. The first bushing 20 is screwed firmly into threaded opening 28 in end 26 of coupling 24 and the stopcock, not shown, is then opened. At this point the service person grips with his right hand grip 12 pulling back, with one finger, brake 18. With the left hand wire 14 is urged forward, causing wire 14, with its guide member 34 leading, to pass through the stopcock at the riser pipe and into the plastic pipe to be located. The wire 14 is payed out from reel 10 until guide member 34 reaches the gas main. A source of R.F. signals, for example, may then be connected to wire 14 and an appropriate pick-up device or sensor may be moved over the ground in the region where the plastic pipe is believed to be. The sensor will indicate precisely the path by which the plastic pipe goes from the riser pipe at the building or house to the main pipe. After the location of the plastic pipe has been plotted on the surface, the signal source is disconnected from the wire 14 and the wire is pulled and fed back into the reel, causing it to rotate: wire 14 is pulled from the plastic pipe by way of the riser pipe and the stopcock, until the wire is removed and has been pushed back into reel 10, at which point the stopcock is closed and the tool is set aside. The maintenance personnel may then excavate with confidence to remove the plastic pipe for its replacement. As has been indicated, this method has been found highly accurate and the time required to locate the plastic pipe for removal has been reduced from seventy minutes to eleven minutes. It is to be understood that the particular sensing method used may not be the R.F. method referred to, but may be a magnetometer technique, since the wire is magnetic in its characteistics. The plastic-pipe locator tool according to this invention has proven highly successful in actual use and is expected to be widely adopted for the indicated purpose.

While a particular embodiment of this invention has been shown and described, it will be apparent to those skilled in the art that variations and modifications may be made without departing from the true spirit and scope of this invention. It is the purpose of the appended claims to cover all such variations and modifications.

We claim:

1. A plastic-pipe locator tool including:
   a hand-grip portion;
   a reel rotatably supported from said hand-grip portion;
   a locator wire extendably carried by said reel, said hand-grip portion having an opening therethrough for the passage of said locator wire;
   a plastic bushing having an opening therethrough of a first diameter and having an externally threaded portion thereon of a second diameter;
   a coupler having first and second ends and having an opening therethrough to permit the passage therethrough of said locator wire;
   said opening through said coupler being internally threaded proximate said first end of said coupler and being dimensioned to receive, in cooperating fashion, said externally threaded portion of said first bushing;
   a packing member for preventing the leaking of fluid from said coupler, said packing member being carried snugly in said opening through said coupler and having a centrally disposed passage therethrough dimensioned to snugly but slidably engage said locator wire as it passes through said coupler; and,
   a guide member affixed to said locator wire at the end of such wire remote from said reel, said guide member being of an oblate-spheroid-like shape.

2. Apparatus according to claim 1 in which said locator wire is piano wire.

3. Apparatus according to claim 1 in which said hand-grip includes releasable locking means for selectively preventing the paying-out of locator wire from said reel.

4. Apparatus according to claim 1 in which said guide member has the shape of a pair of cones coaxial with said locator wire with the bases of the cones in coincidence, one with the other.

5. Apparatus according to claim 3 in which said releasable locking means is normally locked.

* * * * *